United States Patent [19]

Custer

[11] 3,727,884
[45] Apr. 17, 1973

[54] V-BELT TENSIONING MEANS

[76] Inventor: Harry Willis Custer, 30635 Helmandale Drive, Franklin, Mich. 48025

[22] Filed: July 30, 1971

[21] Appl. No.: 167,632

[52] U.S. Cl. ................................. 254/67, 254/100
[51] Int. Cl. .............................................. B66f 3/08
[58] Field of Search............ 254/67, 51, 98, DIG. 10, 254/54, 100, 52; 74/242, 12, 14 R; 287/58 CT, 59, 61; 248/354 S, 352

[56] References Cited

UNITED STATES PATENTS

| 3,325,095 | 6/1967 | Mueller et al. | 254/100 |
| 1,723,970 | 8/1929 | Jauch | 254/100 |

FOREIGN PATENTS OR APPLICATIONS

| 5,489 | 3/1896 | Great Britain | 254/98 |

Primary Examiner—Othell M. Simpson
Assistant Examiner—Robert C. Watson
Attorney—William L. Fisher

[57] ABSTRACT

Improvement in a V-belt tensioning means for tensioning a V-belt operative in respect to a pair of sheaves is disclosed said V-belt tensioning means comprising jack means constructed to be disposed and to be axially operative between said sheaves, said jack means having identical outer ends constructed to engage said sheaves, respectively, said jack means having screw thread means operative to change the length of said tensioning means so as to apply a tensioning force to spread said sheaves apart to tension said V-belt, said improvement comprising said identical outer ends constructed to engage the walls of the V-grooves of said sheaves by each said end comprising a pair of spaced apart cylindrical legs disposed in the same plane and at an obtuse included angle with respect to each other so that when said tensioning means is disposed and made to be axially operative between said sheaves the walls of the V-grooves thereof are engaged by said cylindrical legs to center and lock said tensioning means therebetween.

1 Claim, 3 Drawing Figures

PATENTED APR 17 1973
3,727,884
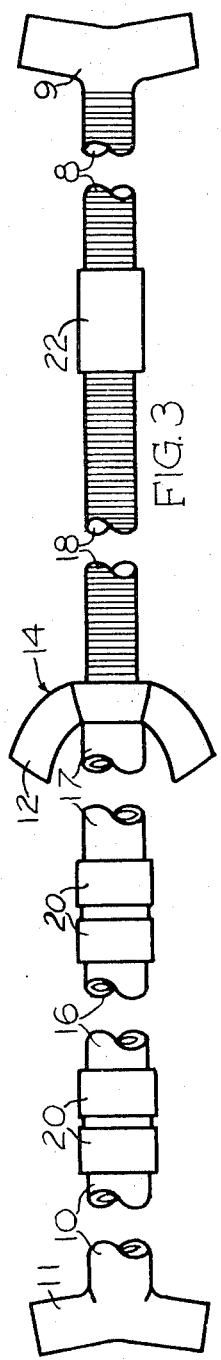
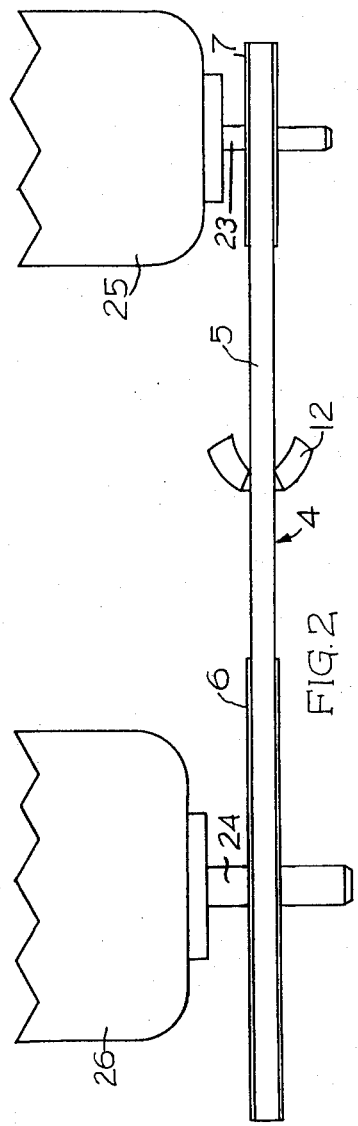
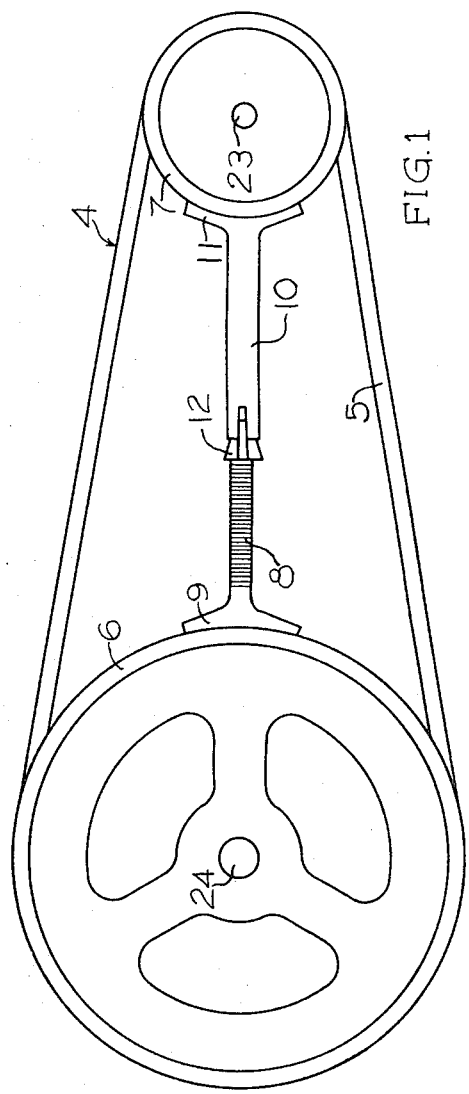
HARRY WILLIS CUSTER
INVENTOR
BY William L. Fisher Esq.
HIS ATTORNEY

V-BELT TENSIONING MEANS

My invention relates to a tool for use with V-belt power drives.

The principal object of my invention is to provide self-centering V-belt tensioning means for tensioning a V-belt in respect to a pair of sheaves.

The foregoing object of my invention and the advantages thereof will become apparent during the course of the following description, taken in conjunction with the accompanying drawings, in which FIGS. 1 and 2 are, respectively, front elevational and top plan views of a V-belt tensioning means embodying my invention;

and FIG. 3 is a front elevational view shown broken of a modified form of said V-belt tensioning means.

Referring to the drawings in greater detail, and first to FIGS. 1 and 2, 4 generally designates the embodiment shown therein of a V-belt tensioning means shown in operative relation to a V-belt 5 and a pair of sheaves 6 and 7. Said sheaves 6 and 7 are carried on shafts 23 and 24, respectively, which are power input or power output shafts of machines 25 and 26, respectively. Depending upon the particular application, one of the machines 25 and 26 is a driver machine, such as a motor, and its shaft 23 or 24 is a power output shaft while the other machine is a driven machine, such as a pump, and its shaft 23 or 24 is a power input shaft. Said V-belt tensioning means comprises jack means having screw thread means and identical outer ends, each of which end comprises a pair of spaced apart cylindrical legs disposed in the same plane and at an obtuse included angle with respect to each other so that when said tensioning means is disposed and made to be axially operative between said sheaves the walls of the V-grooves thereof are engaged by said legs to center and lock my tensioning means therebetween. Said jack means comprises, in the instance, three parts designated 8, 10 and 12. The part designated 8 is a male part with male threads thereon which carries on the outer end thereof a pair of spaced apart cylindrical legs 9. The part designated 10 is a female part with no threads thereon which carries on the outer end thereof a pair of spaced apart cylindrical legs 11. The legs of each of the pairs 9 and 11 are disposed in the same plane and at an obtuse included angle with respect to each other and are each circular in transverse cross-section. At each such cross-section a two point contact with the walls of the V-belt groove is obtained. Because such cross-section is circular said two point contact results even in off-axial positions of my tensioning means. The inner end of the female part 10 telescopes over the inner end of the male part 8. The part designated 12 is a wing nut with female threads thereon which wing nut 12 threadably engages the threaded inner end of said male part 8. The inner end of the wing nut 12 bears against the inner end of the female part 10 and by virtue of its threaded engagement with the male part 8 controls the relative axial position of the parts 8 and 10 and hence the length of said jack means. The following is one example of tensioning a V-belt the machines 25 or 26 is loosened from its base and said jack means is disposed between the pair of sheaves 6 and 7 with the pairs of legs 9 and 11 engaging the side walls of the V-belt grooves of said sheaves 6 and 7, respectively. A tensioning force is applied on the V-belt 5 by rotating said wing nut 12 to lengthen said jack means to spread apart said sheaves 6 and 7. With said sheaves 6 and 7 held spread apart by said jack means in place therebetween said one machine is re-fastened to its base and the jack means is then removed from between the sheaves 6 and 7.

Referring to FIG. 3, 14 generally designates the embodiment shown therein of a V-belt tensioning means which comprises the same jack means of the prior embodiment 4, i.e., the parts 8, 10 and 12, and in addition thereto fourth, fifth and sixth parts 16, 17 and 18. The fourth and fifth parts designated 16 and 17 are second and third female parts with no threads thereon. Means in the form of a coupling 20 with no threads thereon is associated with the female part 16 so that the same can serve as an extension for the first-mentioned female part 10. Another coupling 20 is associated with the female part 17 so that the same can serve as an extension for either of the female parts 10 or 16. Each said coupling 20 is hollow throughout its length and is provided with oppositely facing shoulders against which bear the inner and outer ends, respectively, of the female parts which are coupled thereby. The sixth part designated 18 is a second male part with male threads thereon. Means in the form of a coupling 22 with female threads therein is associated with the male part 18 so that the same can serve as an extension for the first-mentioned male part 8. Said coupling 22 is hollow and threaded throughout its length and threadably engages both said male parts 8 and 18. Further extensions of the male end of the jack means than the one 18 shown may be provided. Using two or three parts for said jack means I can obtain a minimum effective length thereof and any greater needed length with additional parts. For example, with one to three additional parts I can increase the effective length of said jack means by more than five times such minimum effective length.

It will thus be seen that there has been provided by my invention a V-belt tensioning means in which the object hereinabove set forth, together with many thoroughly practical advantages, has been successfully achieved. While a preferred embodiment of my invention has been shown and described, it is to be understood that variations and changes may be resorted to without departing from the spirit of my invention as defined by the appended claims.

I claim:

1. Improvement in V-belt tensioning means for tensioning a V-belt operative in respect to a pair of sheaves; said V-belt tensioning means comprising jack means constructed to be disposed and to be axially operative between said sheaves, said jack means having identical outer ends constructed to engage said sheaves, respectively, said jack means having screw thread means operative to change the length of said tensioning means so as to apply a tensioning force to spread said sheaves apart to tension said V-belt, said improvement consisting of said identical outer ends constructed to engage the walls of the V-grooves of said sheaves by each said end comprising a pair of spaced apart cylindrical legs disposed in the same plane and at an obtuse included angle with respect to each other so that when said tensioning means is disposed and made to be axially operative between said sheaves the walls of the V-grooves thereof are engaged by said cylindrical legs to center and lock said tensioning means therebetween.

* * * * *